Nov. 15, 1960  A. L. HARMAN  2,959,797
MEAT CLEANER
Filed Sept. 16, 1957  2 Sheets-Sheet 1

INVENTOR.
Albert L. Harman
BY
Arnold and Graybeal
ATTORNEYS.

Nov. 15, 1960      A. L. HARMAN      2,959,797
MEAT CLEANER
Filed Sept. 16, 1957      2 Sheets-Sheet 2
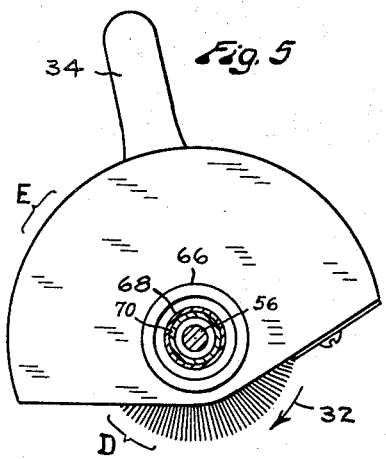
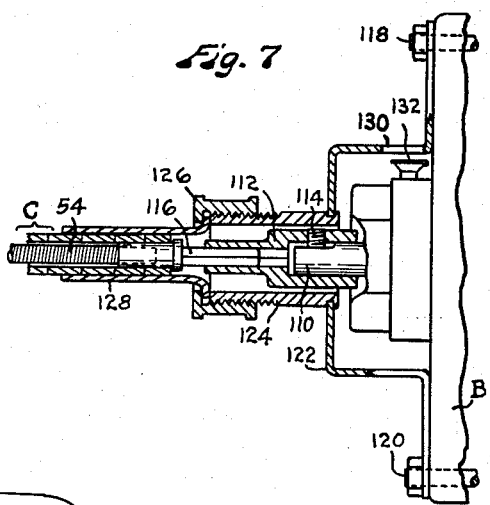
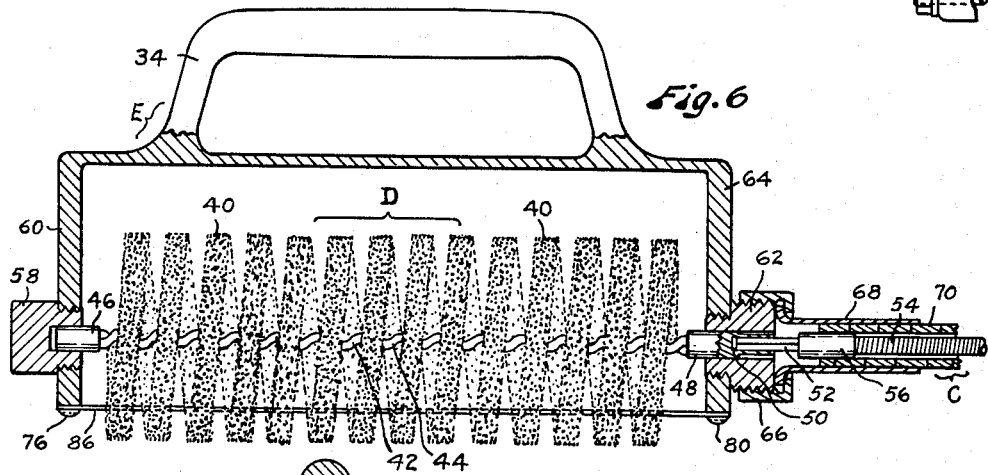
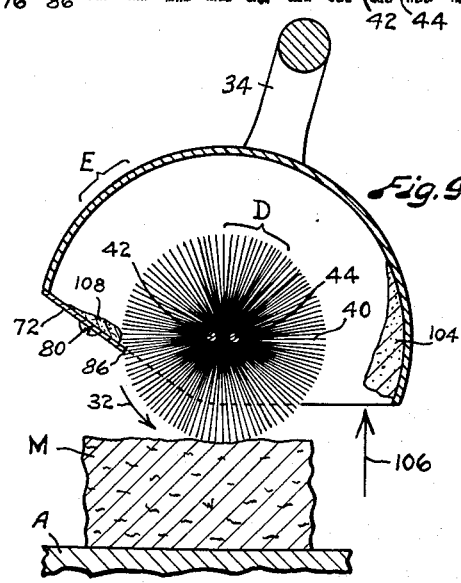
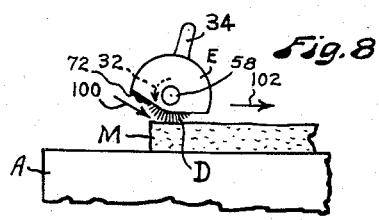
INVENTOR.
*Albert L. Harman*
BY *Arnold and Grayheal*
ATTORNEYS

2,959,797

MEAT CLEANER

Albert L. Harman, 112 Battery St., Seattle 1, Wash.

Filed Sept. 16, 1957, Ser. No. 684,237

4 Claims. (Cl. 15—3.1)

The present invention relates to a meat cleaner and more particularly to a portable, hand operated power driven brush-type cleaning means especially adapted for dry cleaning of saw cut meat.

Customary practice in connection with distribution and retailing of meat involves high volume cutting of beef, pork, veal and lamb quarters or sections into steaks, roasts, chops and the like by means of power sawing equipment, resulting in a deposit and accumulation on the surface and into crevises of the cut meat of bone dust, meat and bone fat and marrow, cut meat particles and the like, which if not removed tend to reduce the marketability of the cut meat by creating an unsightly surface appearance and by giving rise to relatively rapid darkening and eventual spoiling of the cut meat because of darkening and early deterioration of the cut particles.

As a result, customary practice in meat processing involves cleaning of the cut meat by hand wiping with wet rags, coupled with such scraping by hand as may be necessary or desired. Any such manual technique is manifestly tedious, tiring, cumbersome and slow. Further, if wet cleaned as with water or with a wet or damp rag, the meat on being displayed or stored thereafter tends to darken and lose its quality much more rapidly.

While some attempts have been directed to mechanizing, i.e. power operating, cleaning mechanism for the purpose of cleaning saw cut meat, such have by and large proven commercially impractical or unsatisfactory because of undue handling of the meat, because considerable special equipment becomes involved, or because the quality of the meat is impaired as by ineffective cleaning or undue tearing of the cut surfaces.

To obviate the foregoing disadvantages, the present invention has as a primary object the provision of an effective, simple meat cleaner by utilization of which a remarkable savings in time, labor, effort, space and expense are accomplished in high volume cleaning of meat cut by power saw means.

A further and more specific advantage of the present invention involves utilization of a mobile and portable manually manipulated power driven brush means, the entire equipment being much more simply adaptable to existing meat processing equipment, such as cutting blocks or tables. A further, more specific object of the present invention is to contribute to the art a specific type of power driven meat cleaner brush of demonstrable advantage in terms of efficiently cleaning cut meat particles from the meat while not gouging, tearing or otherwise disfiguring the cut surfaces thereof.

Yet another object of the invention is to provide equipment for and a method of power cleaning of saw cut meat by which a cut of meat need not be handled any more than is customary for trimming the same, thus insuring that the cut of meat will not be torn apart or disfigured in texture or appearance. This consideration is an important advantage to the meat processing industry because certain cuts of meat present the problem of breaking open between layers of flesh or fat through the cut if the cut is lifted bodily and moved over a power cleaning device. Thus, a basic and important concept and characteristic of the present invention is that the cleaning device is moved lightly over the meat while the latter is supported flat and stationary, as distinguished from the much more rigorous technique of bodily moving the cut of meat over or past a fixed cleaner element.

Basically, the invention comprises a power driven, portable meat cleaner, having a mobile, hand guided partially encased brush portion, such meat cleaner being ideally constructed as to be rapidly and manually manipulated and guided over the cut surfaces of saw cut meat while the meat is supported flat on a work surface, the character of the brush being such as to efficiently and smoothly clean yet not gouge or tear the meat, and the combined character of the brush and brush casing causing the brush to a degree to be self-cleaning and permitting ease of cleaning of the brush and casing even during continuous operation of the device, such general arrangement of a device according to the present invention advantageously keeping handling of the meat during the cleaning operation at a minimum and permitting the surface of the meat being cleaned at any given instant to be readily viewable by the operator. Further, a basic consideration underlying the present invention is the provision of a meat cleaner essentially simple and durable in construction, capable of long operative life with a minimum of maintenance. Also, with the simple and open construction herein presented, the equipment can be kept clean to the point of operational effectiveness even during continuous operation, and can be completely cleaned with no or at most only minor disassembly.

In terms of time saved and efficiency of labor and effort, it is the object of the present invention to present a portable meat cleaner capable of cleaning meat at least as fast as a power saw produces the cuts of meats, this also being an important consideration because efficient, high volume meat processing ideally should require one operator acting as a sawyer and only one operator conjunctively cleaning the meat. In contrast, when hand methods are used to clean the meat, experience has shown that it takes about three times as long to clean a given amount of meat as is necessary to cut it. Thus, comparatively, a high volume meat processing line on the average requires two or three meat cleaning personnel to handle the output of each sawyer whereas, by utilization of the present invention, only one meat cleaning operator is necessary to form a processing team with each sawyer, thus effecting a very substantial labor saving up to about 50%.

It is a further object of the present invention to provide a portable meat cleaning device which is readily cleanable and readily kept clean during operation of the brush, i.e. cleanable by the operator with the brush still running, thus enabling no interruption in the cleaning of the meat to remove accumulated cut particles from the cleaning device.

Further and more specific objects of the present invention as regards the particular nature of the brush include provision of a brush having nylon or horsehair bristles, it having been found that nylon or horsehair bristles are particularly suited for the specific problem of meat cleaning because bristles of such character are neither so hard nor stiff as to cause gouging or tearing of the meat, and are nevertheless stiff enough to give effective removal of the cut particles. Further, it has been found that with a brush of the spirally wound type, an entirely smooth and even cleaning action is accomplished, a brush having a spiral arrangement of bristles serving to insure that all of the meat surface in the area of contact thereof with the brush is swept each cycle of revolution of the brush. Additionally, it appears that a spirally arranged brush facilitates the cleaning action because such produces a degree of lateral impetus to the cut particles being removed as well as the rotary impetus primarily involved. Thus, the cleaning action of the spirally wound brush characterizing the present invention is in a sense bi-directional in character; primarily of course in the direction of rotation of the brush, and also secondarily in a lateral direction, i.e. generally parallel to the axis of rotation of the brush, achieving a superior cleaning action.

An additional object of the present invention is to provide, in a power driven cleaning device for saw cut meat, a brush and drive mechanism wherein the radial size and speed of rotation of the brush are such as to render the brush self-cleaning in operation, the brush throwing all but a residual portion of the bone and meat dust and fat particles against the associated brush shield at an area of the latter just inside of the brush entrant portion of the shield or casing, where the same is readily accessible for removal.

Yet another object of the present invention, as related to the ease with which the brush may be cleaned, is provision of a brush shield or casing having at the brush entrant side thereof a spaced relation with respect to the brush to permit and facilitate ready removal of accumulated cut particles from the shield or casing merely by use of a finger of the operator, such spaced shield or casing being also provided at the brush emergent side thereof with a relatively closed section or scraper adjustably contacting the brush bristle tips to further clean the brush tips every cycle of revolution of the brush.

With regard to the particular brush casing presented by the present invention, which may be otherwise termed a shield, housing or "fender," a further object of the invention is to provide a brush casing configuration which is cut away or spaced substantially upwardly from the meat along the brush emergent edge of the casing, permitting the operator of the device, without any risk of danger to his hand or fingers, to begin the brushing operation at the very edge of the meat while at the same time holding the meat firmly in place against any tendency the sweeping action of the brush might have to move or curl up the meat, it having been found that the meat, if not held in position, will on occasion wind up around and jam the brush with consequent damage to the meat and possibly the equipment as well. A related object of the present invention is provision of a power driven brush and a brush casing configuration in a meat cleaner where effectively no danger to the operator is presented because the brush turns away from the point at which the fingers or thumb of the operator is placed to hold down and anchor the meat while the same is being cleaned, such safety factor being evident because of and resulting from the rotation of the brush in a manner so that only the brush emergent area of the brush casing is adjacent the edge of the meat as the cleaning operation and movement of the brush across the cut of meat is started.

Yet another object of the present invention, with respect to the ease with which it is cleaned, is to provide a simple brush and brush shield or casing whereby all of the working elements of the device can be simply washed, as by holding under a hot tap water faucet, and the brush spin dried, as desired.

Yet another object of the present invention is to provide a portable hand manipulated and guided brush device for dry cleaning meat, the operationally mobile elements of which are basically light in character so as not to fatigue the operator during extended use and which is readily mobile and manipulatable so that the degree of pressure of the brush on the meat can be effectively regulated, it having been found that the degree of brush pressure on the meat is important because it is the tips of the brush bristles which serve to clean the meat and either too much pressure or too little pressure is not as effective in the cleaning operation as the appropriate degree of pressure. This appropriate degree of pressure, which might otherwise be termed "touch," is readily selectable when the brush is light and mobile, and held and guided by hand.

Further, another related object of the invention is to accomplish, by means of a mobile, hand guided power driven brush, a dry cleaning of the meat, the technique of use of which enables the surface viewed by the operator to be cleaned by one or more relatively light strokes of the brush, it being evident that it is highly advantageous for the surface being cleaned to be under the direct view of the operator to readily catch any portions of the cut area which might accidentally need rebrushing or further cleaning. A related object of the present invention permits movement of the brush rather than the meat in bringing the brush and meat in engagement, it being considered superior and more efficient to move the brush rather than the meat because any tendency for the meat to be deformed or pulled apart is eliminated and any possible lessening of the quality of the meat caused by handling is minimized.

Brush bristles of an appropriate stiffness and a regulatable degree of brush pressure or "touch" are also important from the point of view of the quality of the cleaned meat since it appears that meat processed so as to be substantially clean of cut particles but without any more or less minute tears or gouges in the meat surface has a better lasting quality on storage. It is theorized that this improved durability as to quality is at least in part attributable to the fact that the type of cleaning taught by the present invention serves to somewhat close and seal the cut surface of the meat.

These and other objects, advantages and features of the invention will be apparent from the following description and accompanying illustrations of typical forms thereof, wherein like numerals refer to like parts, and wherein:

Figure 1 is a perspective view, somewhat diagrammatic in character, showing the upper portion of a meat block with the motor or drive portion of the mechanism of the present invention hung on one side of the meat block and with the flexible cable portion thereof leading up to the brush and brush casing portion of the mechanism, the latter being shown in working proximity to the upper surface of the meat block;

Fig. 5 is an end view in elevation of the brush and brush casing and in cross-section of the flexible cable connector illustrated in Fig. 2, taken substantially along line 5—5 thereof;

Fig. 6 is a longitudinal view partly in cross-section and partly in elevation of the brush and brush casing illustrated in Figs. 2 through 5, taken substantially along line 6—6 of Fig. 3;

Fig. 7 is a fragmentary side view partially in elevation and partially in cross-section of the motor and flexible connector mechanism;

Fig. 8 is a schematic view illustrating the manner of use of the power driven cleaning device of the present invention, showing a cut of meat supported on a flat surface, the direction of movement of the brush, its direction of rotation, and the manner in which the cut of meat is held against the flat surface while the exposed surface thereof is being cleaned all being indicated schematically; and Fig. 9 is an enlarged view in cross-section, somewhat schematic in character, also showing the manner of brush rotation against the exposed surface of a supported cut of meat, and further showing the nature of the bone and meat dust and fat particle accumulation primarily in the brush entrant area of the brush casing and to a degree on the scraper element contacting the brush bristle ends, the manner of removal by the operator of the predominant accumulation of cut particles from the casing even during operation of the brush also being shown schematically.

Figure 1:
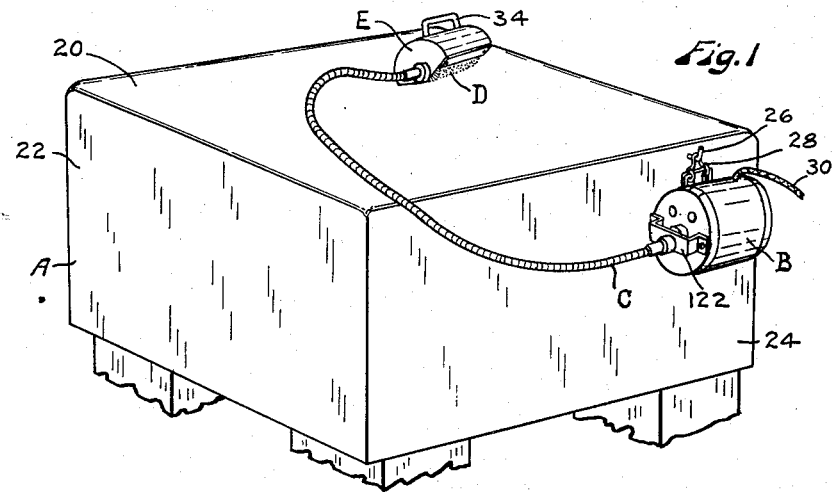
Figure 2:
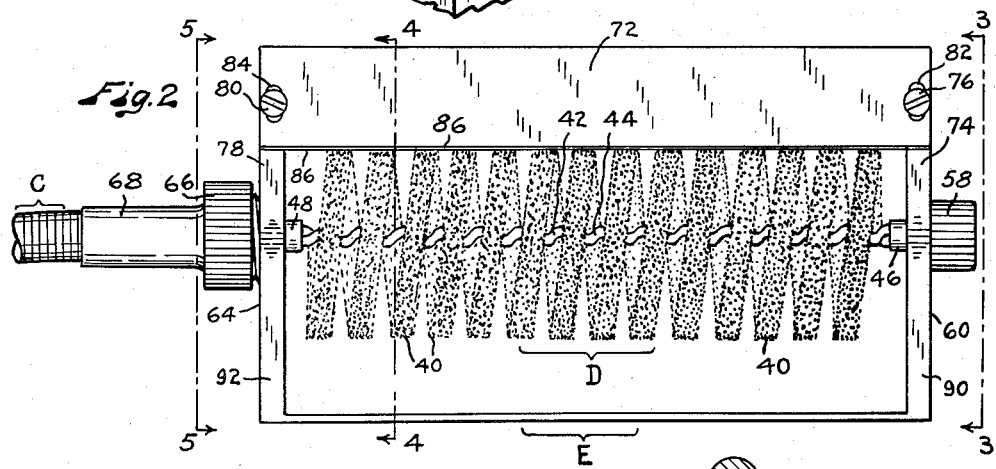
Fig. 2 is a plan view from the bottom of the brush portion of the mechanism, including a segment of the cable drive.
Figure 3:
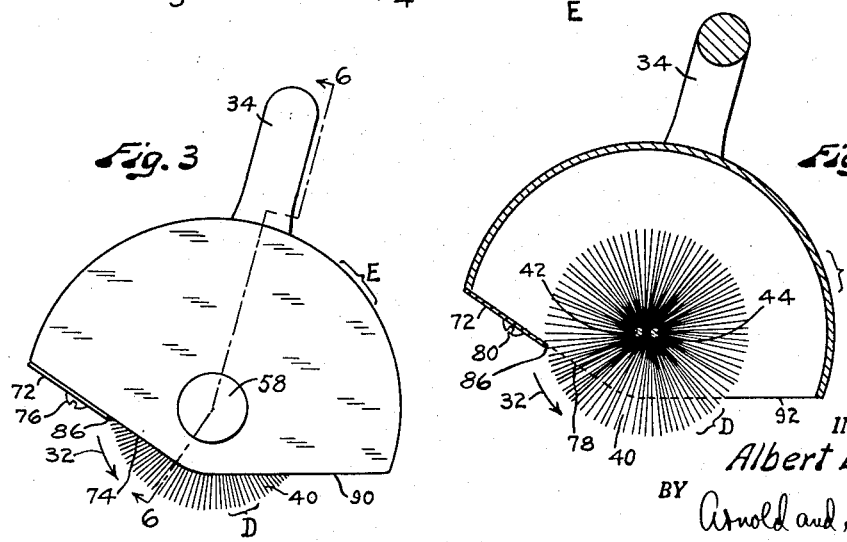
Fig. 3 is an end view of the brush and brush casing illustrated in Fig. 2, taken substantially along line 3—3 thereof.
Figure 4:
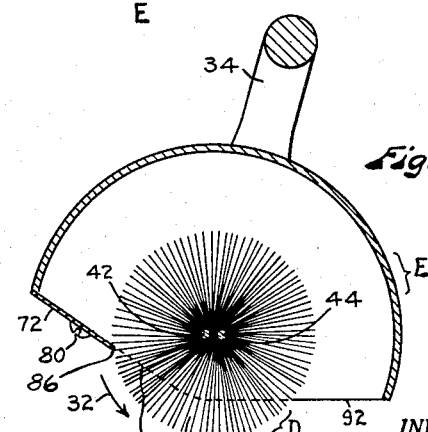
Fig. 4 is a cross-sectional view of the brush and brush casing illustrated in Fig. 2, taken substantially along line 4—4 thereof.

Turning now to a specific consideration of the typical form of the invention illustrated in the accompanying drawings, Fig. 1 discloses a typical installation of the meat cleaner on a conventional meat block A having a generally flat work surface 20 and a front side 22 which the operator faces, the electric drive motor B of the cleaner being preferably mounted on the right side 24 of meat block A by means of a hook or equivalent element 26 and a strap connector 28, the construction of said hook element 26 and strap connector 28 preferably enabling easy removal of the motor B from side 24 of block A for ready portability or storage of the cleaner, as desired.

Motor B is suitably of a type conventional per se, connected through cord 30 to a power source and having, for example, an output rating of 1/12 H.P. and an operating speed of about 1725 r.p.m. Flexible drive shaft C is connected to motor B (the detail of the connector assembly being shown in Fig. 7) and in turn drives brush D in brush shield or casing E, the direction of brush rotation being indicated schematically in Figs. 3–5, 8 and 9 at 32, flexible drive cable C permitting the manipulation of brush casing E and its contained brush D over the entire area of top 20 of meat block A by the operator through means of handle 34, the particular manner of manipulation being discussed in more detail hereinafter.

Turning now to a consideration of the nature and constructional detail of the brush D, the brush shield or casing E and the associated portions of the equipment as illustrated in Figs. 3–6, brush D is typically about two inches in diameter and advantageously of the spiral wound type, bristles 40 being arranged in a helical or spiral pattern, as by anchoring of bristles 40 between spirally wound wires 42 and 44 capped at one end by a cylindrical bearing roller 46 and capped at the other end by a bearing roller 48 provided with a keyway 50 (see Fig. 6) of rectangular or other suitable transverse cross section for receiving key 52 integrally mounted on flexible drive cable core 54 by means of connector sleeve 56.

The end of brush D which is capped by bearing roller 46 rotates in removable cap bearing 58 threaded in the outer end wall 60 of brush shield or casing E (again see Fig. 6) and bearing roller 48 rotates in bearing 62 threaded in end wall 64 of brush shield or casing E. Said bearing 62 is threaded externally to receive threaded connector 66 which removably retains end sleeve 68 on flexible cable casing 70 of flexible drive cable C.

Ready installation and removal of brush D from brush shield E is accomplished merely by removal of bearing cap 58 and manual movement of the brush into the hole in side 60 left by bearing cap 58 until keyway 50 withdraws from key 52 and clears the inner surface of side 64 of shield E, some of bristles 40 adjacent bearing cap 46 engaging and being yieldably bent to the degree necessary to permit this action. Brush D is thereupon readily withdrawable or insertable as the case may be, cap bearing 58 of course being finally replaced in the position illustrated.

Brush casing E further comprises a brush tip cleaning blade 72 spanning the brush emergent side of the brush shield or casing E, one end of said brush tip cleaning blade 72 being attached to edge 74 of side 60 of casing E as by a screw 76 and the other end of said cleaning blade being attached to edge 78 of side 64 of casing E as by screw 80, respective slots 82 and 84 through which screws 76 and 80 pass being provided to enable transverse adjustability of said cleaning blade 72 in order that progressive brush wear or variation in brush size can be compensated for, the proper positioning of cleaning blade 72 in all instances being with the open edge 86 thereof in slight contact with the tips of brush bristles 40, substantially in the manner shown for example in Fig. 9. As a result of the wiping action of edge 86 of cleaning blade 72 on the tips of brush bristles 40, a continuous cleaning of the bristle tips is accomplished, such being a very important factor because it is the very tips of the brush bristles which accomplish most of the cleaning action, i.e. removal of bone and meat dust and fat particles from the surface of the cut of meat.

Another distinctive and fundamentally advantageous feature of the brush casing construction according to the present invention, in the form thereof illustrated, is the specific upwardly angled or cutaway construction of the casing along edges 74 and 78 thereof, i.e. along the brush emergent side. As evident from Figs. 1, 3–5, 8 and 9, the plane of edge portions 74 and 78 of respective casing sides 60 and 64 diverge upwardly from the plane of respective edge portions 90 and 92 of said casing sides 60 and 64 at an angle of about 30°, leaving an included angle of about 120° between respective edges 74 and 90, and 78 and 92. With the casing E held in the normal position of use, as illustrated in Figs. 1, 8 and 9 for example, the cutaway or exposed area under the brush casing E thus provided serves a very important function in the use of the equipment since it has been found that in order to clean the entire exposed surface of a given cut of meat by means of a mobile, power driven brush, the brush should begin its sweeping action at about the very edge of the cut and this would not be possible without a shield presenting a cutaway area at the emergent side of the brush because the operator must hold down the edge of the cut of meat which is first contacted by the rotating brush because otherwise the cut of meat often will have a tendency to wrap around the brush and get in between the brush and casing, causing the brush to jam with consequent possible damage to both the cut of meat and the equipment.

Thus, and with particular regard to the illustration thereof in Figs. 1 and 8, the manner of operation of the mobile, power driven meat cleaner here presented involves placement of the cut of meat M flat on a supporting surface such as surface 20 of meat block A, the brush D in its casing E being manipulated by handle 34 of the latter being grasped by the operator in an obvious manner, the cut of meat M being held in position on block A by the thumb or fingers of the other hand of the operator, as schematically indicated at 100 (Fig. 8). With the cut of meat M so anchored, the rotating brush D is brought in contact with the exposed cut surface of the meat M at about the edge thereof shown at the left hand in the view of Fig. 8, and the rotating brush D is drawn across the cut of meat M to effect the cleaning of the exposed surface thereof, such direction of movement of brush D being schematically indicated at 102 (Fig. 8). Once the brush D has passed over the exposed surface of the cut of meat M, the clean surface is of course readily viewable by the operator to see whether all areas of the surface have been cleaned, it being evident that should any portion of the surface area need further cleaning, such is very quickly accomplished merely by another pass of the brush D in the direction 102 over that portion of the cut of meat M which it is desired to reclean.

With one surface of the cut of meat M cleaned, the cut of meat is then merely flipped over on surface 20 of block A and the cleaning operation repeated as to the then exposed second cut surface of the cut of meat M.

In connection with the above typical operation of the equipment according to the present invention, it is important to observe that, at all times during the actual cleaning operation, the cut of meat M is entirely supported in a flat position and is not distorted, distended, drawn or torn apart as would often be the case if a cut of meat were manipulated past a fixed brush or a brush rotating about a fixed axis. Further, the extent of pressure of the brush against the surface of the cut of meat is readily selectable and maintainable at any desired degree, depending upon the nature of the cut of meat at hand and the individual preference of the operator. Also, the cleaning of a cut of meat can be accomplished in conjunction with other processing, such as trimming, and is most quickly and effectively performed consistent with competitive requirements of labor efficiency and product quality in the art.

Another feature and advantage of the equipment of the present invention, as has been indicated, lies in the degree to which the brush is self-cleaning, and the ease with which the accumulated meat and bone dust and fat particles removed from the cuts of meat may be cleaned from the brush casing. In this respect, Fig. 9 presents in cross-sectional and somewhat schematic view the brush D and casing E in operative relation with respect to a cut of meat M, the enlarged view of Fig. 9 being similar to the view of the equipment shown in Fig. 8, it being a characteristic advantage of the equipment presented that the diameter, speed of rotation and the nature of the bristles 40 of brush D is such that a predominant portion of the bone and meat dust and fat particles accumulate at the inner surface of the brush entrant portion of casing E, as typically indicated at 104 in Fig. 9. As will be evident, this accumulation 104 of cut particles can be readily and in large part removed by the operator even during continued rotation of brush D simply by insertion of a finger into the area between the entrant side of brush D and the adjacent inner wall of casing E, in the manner schematically indicated at 106. As will also be seen from the view of Fig. 9, a minor accumulation of bone and meat dust and fat particles builds up on brush cleaning scraper 72, such accumulation being indicated at 108. This accumulation 108 results largely from cleaning of the very tips of brush bristles 40 and, although contributing very effectively to the efficiency of the cleaning action of brush D, such accumulation is not of such degree as to interfere with even extended use of the equipment and can be cleaned from the cleaner blade 72 after each period of use by the removal and washing of the brush D frrom casing E in the manner discussed above.

Fig. 7 illustrates in side elevational view, with various parts shown in cross-section, the connection of flexible shaft C with the drive motor B. Drive shaft 110 of motor B has mounted thereon a keyway sleeve 112, as by screw 114, the outer end of said keyway sleeve 112 receiving cross-sectionally rectangular key 116 pressed on flexible drive shaft 54 of flexible cable C. Assembly bolts 118 and 120 of motor B mount strap 122 and a connector sleeve 124 in position to receive threaded connector 126 of flexible cable C in the manner shown, said connector 126 retaining end sleeve 128 of flexible cable C against said connector sleeve 124. Mount strap 122, in the typical construction presented, is provided with a access hole 130 for oil fitting 132 of motor B.

From the foregoing description of the typical equipment and manner of operation characterizing the present invention it will be apparent that various modifications thereof can be made within the skill of the art. For example, while the meat cleaner is primarily disclosed as installed on and used in connection with a conventional meat block A, it will be evident that the equipment is equally usable with any available work surface and that drive motor B can be hung by, along, or above, or in otherwise associated relationship with any available flat work surface, other forms of work surfaces customary in the art being work tables, back bars, or conveyor means on which the meat is handled or along which the meat is moved while being processed.

Further, while a typical form of flexible cable, drive motor and brush mounting means is provided, it will be apparent that wide variation is possible with respect to the specific forms of the drive and brush mounting mechanism which can be employed. Likewise, while the mechanism is presented for right hand manipulation, i.e. flexible cable shaft 54 is left hand wound and the brush D is driven so that the meat contacting arc thereof moves toward the operator when the casing E is held by handle 34 in the right hand of the operator, nevertheless a reverse arrangement for left-hand operation or equivalent will be evident.

Other variations and modifications will be readily discerned by those skilled in the art, within the scope of the following claims.

What is claimed is:

1. A portable meat cleaning mechanism for removing sawn particles including bone and meat dust and fat particles from the surface of saw cut meat comprising an elongated shield; a power driven rotary cylindrical brush rotatably mounted in said shield and extending substantially throughout the length of said shield, said shield having end wall members journaling said brush and transverse of said length with a bottom edge coutour inclined upwardly from a point radially below the axis of rotation of the brush to the front longitudinal edge and to the rear longitudinal edge of said shield, the bristles of said brush extending below the front and rear edges of the shield and spaced from said edges, said inclination providing an entrant opening for an open meat contacting bottom area and providing an area enclosed above said brush which is adjacently spaced to the top of said brush, the front edge of said shield being spaced in direction towards which the brush revolves, leaving the space between the shield and the brush as an entrant opening to the area enclosed above said brush through which opening said bone, dust and fat particles may be discharged from the revolving bristles against the inner side of said shield as the bristles leave said cut meat; a handle mounted on the top of said shield midway between said front and rear edge whereby the front edge may be manually disposed to the vertical so as to vary its closeness to the meat being cleaned to enable said shield to intercept the discharged particles; a cleaner blade extending from said shield into the outer peripheral portion of said bristles on an emergent side opposite the entrant side, the brush moving past said cleaner blade to engagement with said saw cut meat, the rotational speed of said brush being of a magnitude providing centrifugal force of the brush in discharging the sawn particles to cause them to adhere to the inner surface of the entrant side of the shield; the spacing of the brush and the shield on the entrant side permitting and facilitating ready removal of the said deposited particles so accumulated from the inner side of the shield merely by means of a finger of the operator.

2. The mechanism of claim 1 wherein the bristles of the brush are spirally disposed.

3. The mechanism of claim 1 wherein the bristles are formed of horsehair.

4. The mechanism of claim 1 wherein the bristles are formed of nylon.

References Cited in the file of this patent

UNITED STATES PATENTS

| 157,798 | Davis | Dec. 15, 1874 |
|---|---|---|
| 554,707 | Michner | Feb. 18, 1896 |
| 621,236 | Farmer | Mar. 14, 1899 |
| 887,867 | Kuettner et al. | May 19, 1908 |
| 1,374,181 | Bohlman | Apr. 12, 1921 |
| 1,480,461 | Nutter | Jan. 8, 1924 |
| 1,509,892 | Zielinski | Sept. 30, 1924 |
| 1,578,188 | Burton | Mar. 23, 1926 |
| 1,927,566 | Hawk | Sept. 19, 1933 |
| 2,587,038 | Goodell | Feb. 26, 1952 |

FOREIGN PATENTS

| 72,711 | Sweden | Sept. 22, 1931 |
|---|---|---|

OTHER REFERENCES

"Osborn Brushes" Catalog No. 200, 1947, pages 4–6.